(12) United States Patent
Jones et al.

(10) Patent No.: US 7,753,512 B2
(45) Date of Patent: *Jul. 13, 2010

(54) SYSTEM FOR MAINTAINING TEMPERATURE OF A FLUID IN A CONDUIT

(75) Inventors: Brent R. Jones, Sherwood, OR (US); Brian Walter Aznoe, Sherwood, OR (US); Charles Russell Firkins, Newberg, OR (US); Darrell Ray Finneman, Albany, OR (US); James Michael Bonicatto, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 772 days.

This patent is subject to a terminal disclaimer.

(21) Appl. No.: 11/642,801

(22) Filed: Dec. 20, 2006

(65) Prior Publication Data

US 2008/0149189 A1  Jun. 26, 2008

(51) Int. Cl.
*B41J 2/175* (2006.01)
(52) U.S. Cl. .............................. 347/88; 347/99; 347/103
(58) Field of Classification Search .................. 347/88, 347/99, 103
See application file for complete search history.

(56) References Cited

U.S. PATENT DOCUMENTS

| | | | |
|---|---|---|---|
| 6,142,707 A | 11/2000 | Bass et al. | |
| 6,824,241 B2 * | 11/2004 | Sonnichsen et al. | 347/20 |
| 6,860,591 B2 * | 3/2005 | Slotto et al. | 347/85 |
| 7,025,126 B1 | 4/2006 | Wyatt et al. | |
| 7,066,730 B2 | 6/2006 | Macaluso | |
| 2005/0012792 A1 | 1/2005 | Kumagai et al. | |
| 2005/0046681 A1 | 3/2005 | Kumagai et al. | |

* cited by examiner

*Primary Examiner*—Manish S Shah
(74) *Attorney, Agent, or Firm*—Maginot, Moore & Beck LLP

(57) ABSTRACT

A fluid transport apparatus maintains temperature of a fluid transported through a conduit. The fluid transport apparatus includes a fluid transport conduit for transporting fluid, the fluid transport conduit having an inlet end that is coupled to a fluid supply and an outlet end that is coupled to a receiving port, a compressor conduit configured to pump fluid through the fluid transport conduit by pressurizing and venting the compressor conduit, and a thermal conductor configured to achieve a non-ambient temperature for the fluid within the fluid transport conduit as the compressor conduit is operated to move the fluid through the fluid transport conduit.

17 Claims, 9 Drawing Sheets

SYSTEM FOR MAINTAINING TEMPERATURE OF A FLUID IN A CONDUIT

CROSS-REFERENCE TO RELATED APPLICATIONS

Reference is made to commonly-assigned co-pending U.S. patent application Ser. No. 11/511,697, filed on Aug. 29, 2006, which is entitled "System And Method For Transporting Fluid Through A Conduit," the disclosure of which is hereby expressly incorporated in its entirety herein.

TECHNICAL FIELD

This disclosure relates generally to machines that pump fluid from a supply source to a receptacle, and more particularly, to machines that move thermally treated fluid through a conduit.

BACKGROUND

Fluid transport systems are well known and used in a number of applications. For example, heated fluids, such as melted chocolate, candy, or waxes, may be transported from one station to another during a manufacturing process. Other fluids, such as milk or beer, may be cooled and transported through conduits in a facility. Viscous materials, such as soap, lubricants, or food sauces, may require thermal treatment before being moved through a machine or facility.

One specific application of transporting a thermally treated fluid in a machine is the transportation of ink that has been melted from a solid ink stick in a phase change printer. Solid ink or phase change ink printers conventionally use ink in a solid form, either as pellets or as ink sticks of colored cyan, yellow, magenta and black ink, that are inserted into feed channels through openings to the channels. Each of the openings may be constructed to accept sticks of only one particular configuration. Constructing the feed channel openings in this manner helps reduce the risk of an ink stick having a particular characteristic being inserted into the wrong channel. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al. describe exemplary systems for delivering solid ink sticks into a phase change ink printer.

After the ink sticks are fed into their corresponding feed channels, they are urged by gravity or a mechanical actuator to a heater assembly of the printer. The heater assembly includes a heater that converts electrical energy into heat and a melt plate. The melt plate is typically formed from aluminum or other lightweight material in the shape of a plate or an open sided funnel. The heater is proximate to the melt plate to heat the melt plate to a temperature that melts an ink stick coming into contact with the melt plate. The melt plate may be tilted with respect to the solid ink channel so that as the solid ink impinging on the melt plate changes phase from solid to liquid, it is directed to drip into the reservoir for that color. The ink stored in the reservoir continues to be heated while awaiting subsequent use.

Each reservoir of colored, liquid ink may be coupled to a print head through at least one manifold pathway. The liquid ink is pulled from the reservoir as the print head demands ink for jetting onto a receiving medium or image drum. The print head elements, which are typically piezoelectric devices, receive the liquid ink and expel the ink onto an imaging surface as a controller selectively activates the elements with a driving voltage. Specifically, the liquid ink flows from the reservoirs through manifolds to be ejected from microscopic orifices by piezoelectric elements in the print head.

A number of known methods, such as variable displacement or peristaltic pumps, exist for pumping fluid from one station to another station through a conduit. Another transport method is the use of a compressor conduit disclosed in the patent cross-referenced above. While these various methods may be effective for transporting fluid through a conduit, they do not regulate the temperature of fluid being transported through the conduit. In some applications, fluid is transferred from one location to another at sufficient volume or flow rate that temperature regulation during transit is not required. Delivery of hot water through plumbing in a home or office is such an example. Other applications, however, require that transported fluids be maintained within a temperature range. In still other applications, the volume of fluid being transported or the flow rate of the transported fluid is sufficiently low that heat may be lost or gained during transit. In these applications, the addition or loss of heat during transport may adversely affect the usefulness of the fluid at the receiving station. Therefore, temperature regulation of thermally treated fluids in some applications is a relatively important aspect of the system's effectiveness.

In applications where temperature of a transported fluid is important, all or portions of a pump may be heated or cooled. Such heating or cooling, however, requires time for the initial pump temperature to be reached at system initialization or during recovery from a standby condition that may occur during operation of the system. In applications where availability of a system is time critical, waiting for the pump to reach the initial temperature may be unacceptable. Maintaining the pump at or near the initial temperature may result in excessive energy consumption. Other approaches to maintaining fluids transported in conduits at temperatures different than ambient conditions are required.

SUMMARY

A fluid transport apparatus maintains temperature of a fluid transported through a conduit. The fluid transport apparatus includes a fluid transport conduit for transporting fluid, the fluid transport conduit having an inlet end that is coupled to a fluid supply and an outlet end that is coupled to a receiving port, a compressor conduit configured to pump fluid through the fluid transport conduit by pressurizing and venting the compressor conduit, and a thermal conductor configured to achieve a non-ambient temperature for the fluid within the fluid transport conduit.

A phase change ink imaging device may incorporate such a fluid transport apparatus to maintain temperature of melted ink as it is pumped from a melted ink collector to a melted ink reservoir. The phase change ink image device includes an ink melter for melting solid ink sticks to produce melted ink, a melted ink collector for collecting melted ink produced by the melting element, a melted ink transport apparatus for transporting melted ink from the melted ink collector, a melted ink reservoir for storing melted ink received from the melted ink transport apparatus, a print head for receiving melted ink from the melted ink reservoir, and an imaging surface onto which the print head ejects melted ink to form an image. The melted ink transport apparatus further includes a fluid transport conduit for transporting melted ink, the fluid transport conduit having an inlet end that is coupled to the melted ink collector and an outlet end that is coupled to the melted ink reservoir, a compressor conduit configured to pump fluid through the fluid transport conduit by pressurizing and venting the compressor conduit, and a thermal conductor configured to achieve a non-ambient temperature for the fluid within the fluid transport conduit as the compressor conduit is operated to move the fluid through the fluid transport conduit. A fluid pump is coupled to an inlet of the compressor conduit to inject fluid into the compressor conduit, and a venting valve is coupled to the compressor conduit for selectively relieving pressure in the compressor conduit. The venting valve is operated to pressurize and vent the compressor conduit for pumping melted ink through the ink transport conduit.

BRIEF DESCRIPTION OF THE DRAWINGS

The foregoing aspects and other features of an fluid transport apparatus and an ink imaging device incorporating a fluid transport apparatus are explained in the following description, taken in connection with the accompanying drawings, wherein.

DETAILED DESCRIPTION

Figure 1:
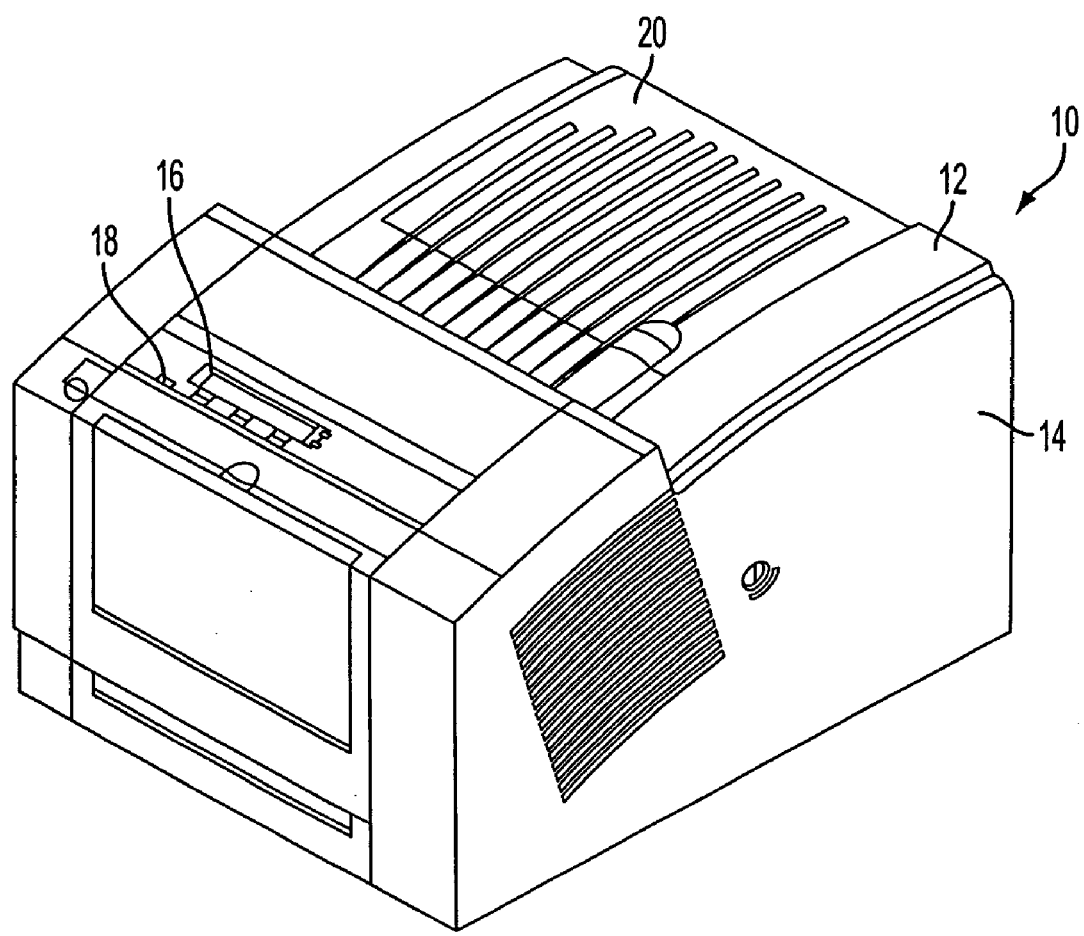
FIG. 1 is a perspective view of a phase change imaging device having a fluid transport apparatus described herein.

Referring to FIG. 1, there is shown a perspective view of an ink printer 10 that incorporates a fluid transporting apparatus, described in more detail below, which delivers melted ink to a reservoir with sufficient pressure to overcome the fluid resistance of a filter. The reader should understand that the fluid transporting apparatus is disclosed as being in an embodiment of a solid ink printer, but the fluid transporting apparatus may be configured for use in other fluid transporting applications. Therefore, the fluid transporting apparatus discussed herein may be implemented in many alternate forms and variations. In addition, any suitable size, shape or type of elements or materials may be used.

FIG. 1 shows an ink printer 10 that includes an outer housing having a top surface 12 and side surfaces 14. A user interface display, such as a front panel display screen 16, displays information concerning the status of the printer, and user instructions. Buttons 18 or other control elements for controlling operation of the printer are adjacent the user interface window, or may be at other locations on the printer. An ink jet printing mechanism (FIG. 3) is contained inside the housing. A melted ink transporting apparatus collects melted ink from a melting element and delivers the melted ink to the printing mechanism. The melted ink transporting apparatus is contained under the top surface of the printer housing. The top surface of the housing includes a hinged ink access cover 20 that opens as shown in FIG. 2, to provide the user access to the ink feed system.

Figure 2:
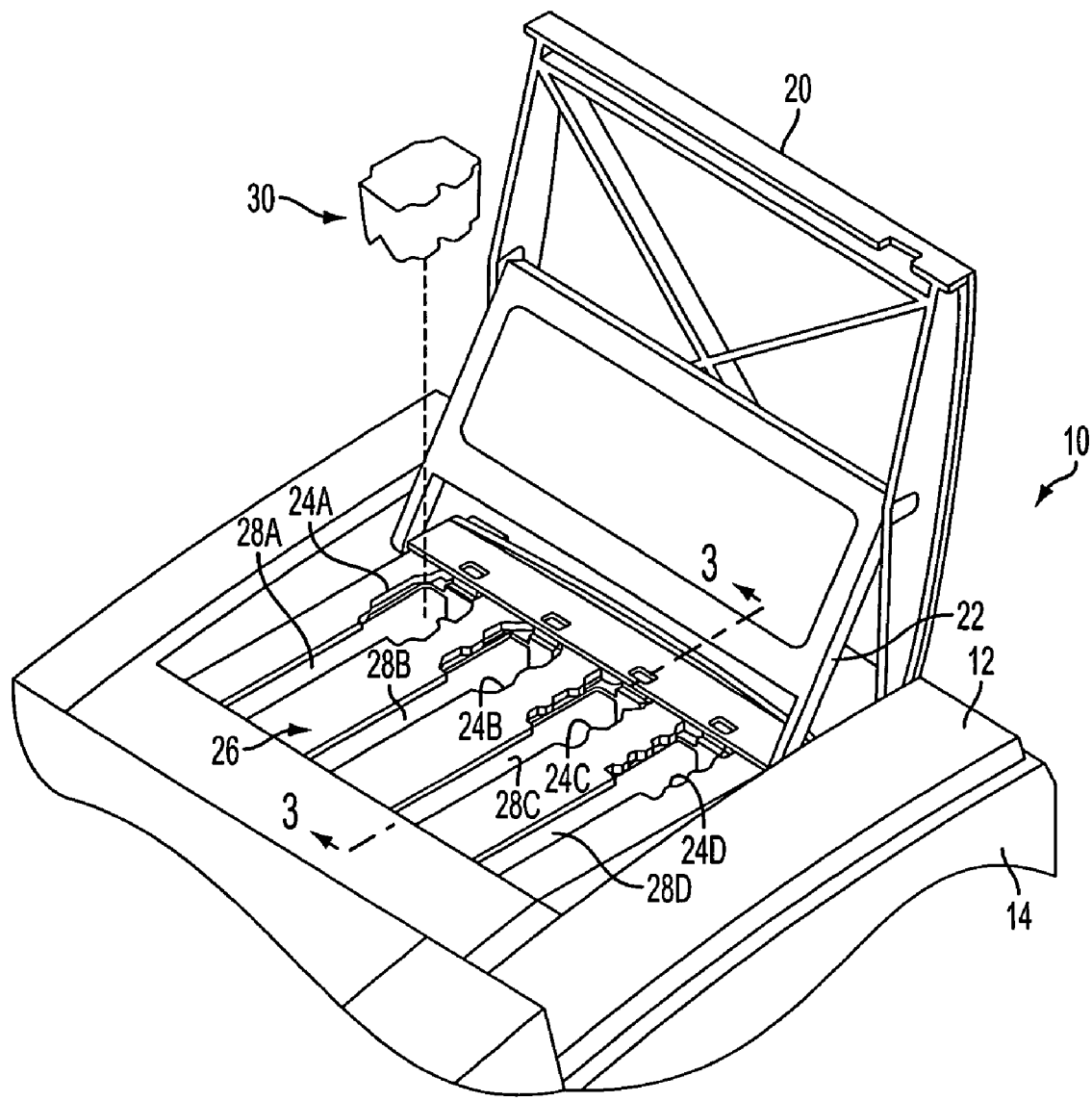
FIG. 2 is an enlarged partial top perspective view of the phase change imaging device with the ink access cover open, showing a solid ink stick in position to be loaded into a feed channel.

In the particular printer shown in FIG. 2, the ink access cover 20 is attached to an ink load linkage element 22 so that when the printer ink access cover 20 is raised, the ink load linkage 22 slides and pivots to an ink load position. The ink access cover and the ink load linkage element may operate as described in U.S. Pat. No. 5,861,903 for an Ink Feed System, issued Jan. 19, 1999 to Crawford et al. As seen in FIG. 2, opening the ink access cover reveals a key plate 26 having keyed openings 24A-D. Each keyed opening 24A, 24B, 24C, 24D provides access to an insertion end of one of several individual feed channels 28A, 28B, 28C, 28D of the solid ink feed system.

A color printer typically uses four colors of ink (yellow, cyan, magenta, and black). Ink sticks 30 of each color are delivered through one of the feed channels 28A-D having the appropriately keyed opening 24A-D that corresponds to the shape of the colored ink stick. The operator of the printer exercises care to avoid inserting ink sticks of one color into a feed channel for a different color. Ink sticks may be so saturated with color dye that it may be difficult for a printer user to tell by color alone which color is which. Cyan, magenta, and black ink sticks in particular can be difficult to distinguish visually based on color appearance. The key plate 26 has keyed openings 24A, 24B, 24C, 24D to aid the printer user in ensuring that only ink sticks of the proper color are inserted into each feed channel. Each keyed opening 24A, 24B, 24C, 24D of the key plate has a unique shape. The ink sticks 30 of the color for that feed channel have a shape corresponding to the shape of the keyed opening. The keyed openings and corresponding ink stick shapes exclude from each ink feed channel ink sticks of all colors except the ink sticks of the proper color for that feed channel.

Figure 3:
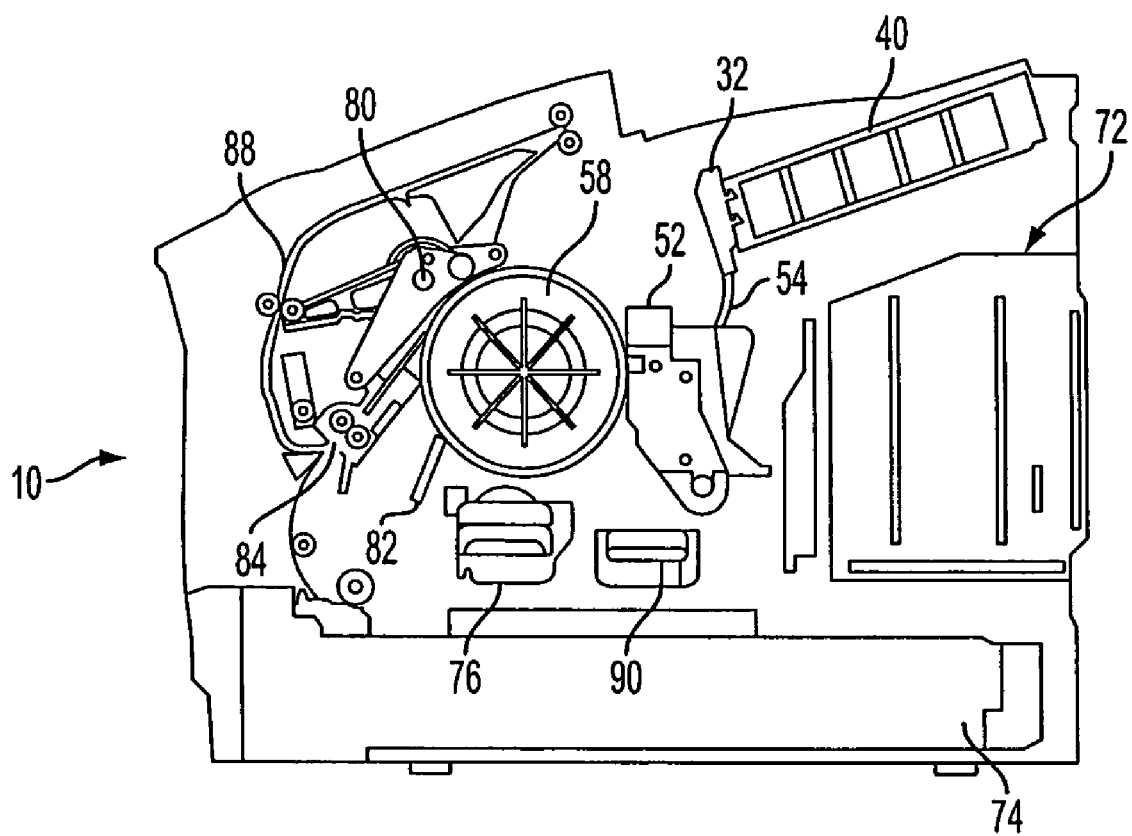
FIG. 3 is a side view of the ink printer shown in FIG. 2 depicting the major subsystems of the ink imaging device.

As shown in FIG. 3, the ink printer 10 may include an ink loading subsystem 70, an electronics module 72, a paper/media tray 74, a print head 52, an imaging drum 58, a drum maintenance subsystem 76, a transfix subsystem 80, a wiper subassembly 82, a paper/media preheater 84, a duplex print path 88, and an ink waste tray 90. In brief, solid ink sticks 30 are loaded into ink loader feed path 40 through which they travel to a solid ink stick melting chamber 32. At the melting chamber, the ink stick is melted and the liquid ink is pumped through a transport conduit 54, in a manner described below, to a reservoir for storage before being delivered to print elements in the print head 52. The ink is ejected by piezoelectric elements through apertures to form an image on the intermediate transfer layer of the imaging drum 58 as the drum rotates. An imaging drum heater is controlled by a controller in the electronics module 72 to maintain the imaging drum within an optimal temperature range for generating an ink image and transferring it to a sheet of recording media. A sheet of recording media is removed from the paper/media tray 74 and directed into the paper pre-heater 84 so the sheet of recording media is heated to a more optimal temperature for receiving the ink image. Recording media movement between the transfer roller in the transfer subsystem 80 and the image drum 58 is coordinated for the phasing and transfer of the image.

Figure 4:
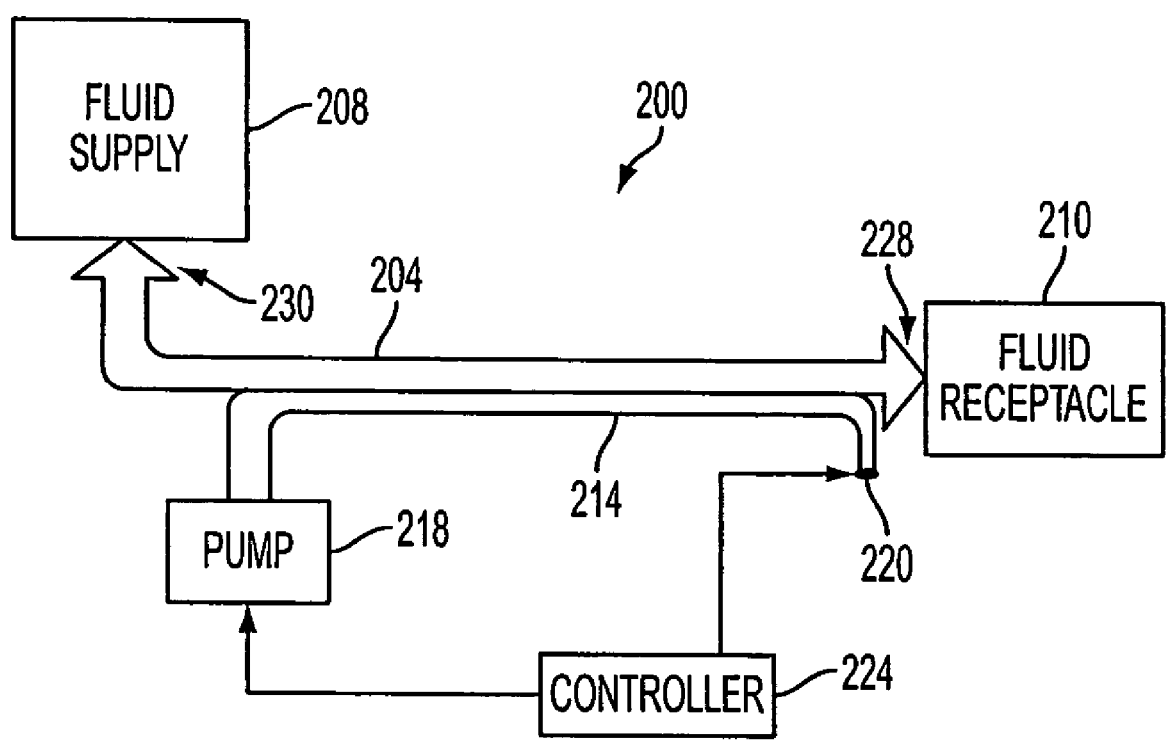
FIG. 4 is a schematic view of a fluid transporting apparatus.

A schematic view of one embodiment of a fluid transporting apparatus 200 is shown in FIG. 4. The apparatus includes a fluid transporting conduit 204 having its inlet coupled to a fluid supply 208 and its outlet coupled to a receiving port for a fluid receptacle 210. A compressor conduit 214 has its inlet coupled to the outlet of a pump 218 and its outlet coupled to a vent 220. Compressor conduit 214 is proximate to a portion of the conduit 204. The vent 220 and the pump 218 are electrically coupled to a controller 224 for selectively activating and deactivating these components. The pump 218 may be a fixed or variable displacement pump that is driven by a motor (not shown). The motor may be external to or incorporated within a housing for the pump 218. As used herein, a conduit is a body having a passageway through which fluid or gas may be conveyed, such as a pipe or tube, for example.

The apparatus 200 implements a method for pumping fluid from the fluid supply 208 to the fluid receptacle 210 that does not require complete collapse of the fluid transporting conduit 204. The method includes fluid from the fluid supply 208 being drawn into the fluid transporting conduit 204 in one phase of the pumping cycle and fluid is ejected from the outlet of the conduit 204 into the receptacle 210 during another phase of the cycle. After activation by the controller 224, the pump 218 injects a fluid into compressor conduit 214. Because the controller 224 has operated the vent 220 to be closed, the injection of fluid into the conduit 214 exposes the conduit wall 214 to a higher pressure, which expands a selected portion of the wall in the configuration shown. This expansion compresses the wall of the conduit 204 along the portion that is proximate the conduit 214. The effectiveness of the transport conduit compression depends upon the geometry of the conduits and materials from which the conduits are made as well as the duration of the cycle phases and pressures used for compression. This compression ejects a portion of the fluid within the conduit into the receptacle 210. The controller 224 operates the vent 220 to open, which relieves the pressure within the compressor conduit 214 and the conduit 204 rebounds to its former shape. As the conduit rebounds, the conduit 204 returns to its nominal, larger volume shape, which pulls fluid from the fluid supply 208 into the conduit 204. The next cycle of pressurizing and venting the conduit 214 pumps at least a portion of that fluid volume through the fluid transporting conduit 204 outlet. A check valve 228 may be provided at the outlet of the fluid transporting conduit 204 to block fluid from the fluid receptacle from re-entering the conduit 204. Likewise, a check valve 230 may be coupled to the inlet of the fluid transporting conduit 204 to block fluid within the conduit 204 from re-entering the fluid supply 208.

The fluid transport apparatus may incorporate a variety of structures for relieving pressure in the compressor conduit. These structures may include a vent port, as described above, for opening the conduit to a lower pressure area so a pressure drop occurs within the compressor conduit. In a closed system, such as a piston within a cylinder that is coupled to the compressor conduit, the return stroke of the piston withdraws the compression fluid into the cylinder so the transport conduit is able to rebound. Other structures for relieving pressure may be used to reduce pressure within the compressor conduit so the fluid transport conduit may rebound and draw fluid into the fluid transport conduit. All such structures are encompassed within the term "vent" as used herein.

Because the compression and decompression of the fluid transporting conduit 204 in the apparatus 200 occurs along a portion of the fluid transporting conduit that is longer than a typical section of conduit pinched by a typical peristaltic pump, the flexing of the conduit wall need not be as extensive as required with a peristaltic pump. The reduction in conduit wall compression and decompression helps extend the life of the conduit. In one embodiment of the apparatus 200, the pump is an air compressor. Such a pressure source is relatively inexpensive.

Figure 5:
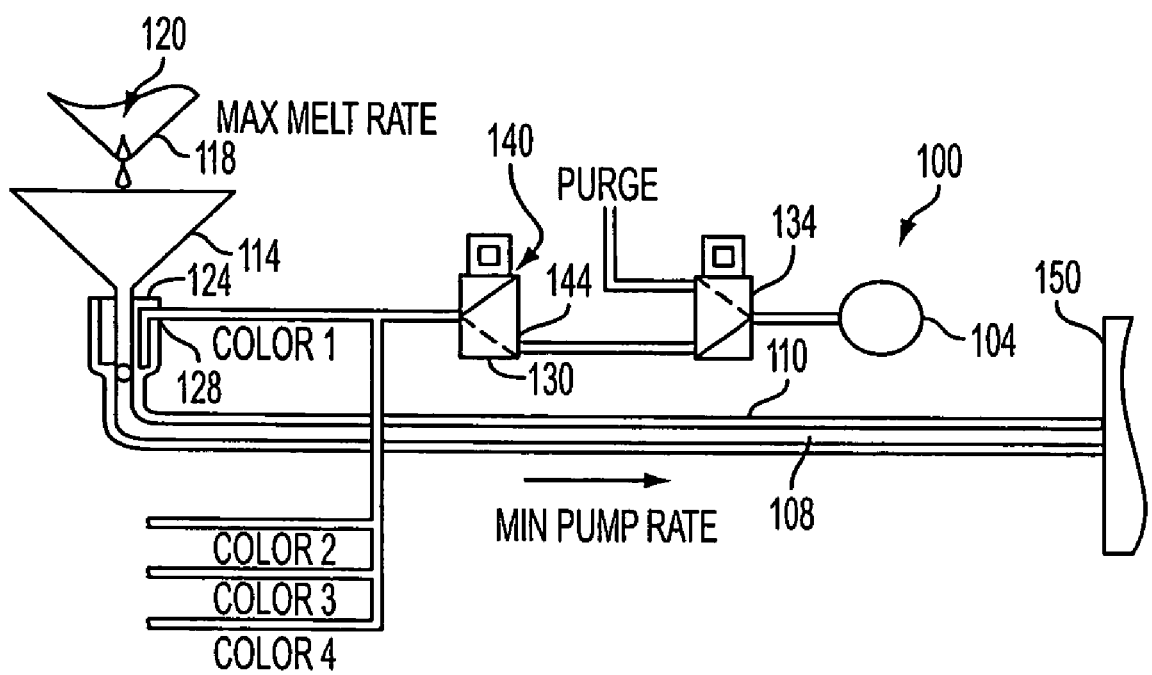
FIG. 5 is a schematic view of a melted ink transporting apparatus.

A schematic view of one embodiment of a fluid transporting apparatus 100 that may be used for melted ink is shown in FIG. 5. The apparatus 100 is similar to the fluid transporting apparatus 200 and includes a pump 104, a melted ink transporting conduit 108, and a compressor conduit 110. An inlet of the ink transporting conduit 108 is coupled to a collector 114 for catching ink as solid ink sticks are liquefied by a melting element 120. The melting element 120 may be a conventional melt plate with a single drip point or it may have another configuration, such as a melting trough, a plate with multiple drip points, or a melting chamber like those disclosed in co-pending U.S. patent application Ser. No. 11/411, 678 entitled "System And Method For Melting Solid Ink Sticks In A Phase Change Ink Printer," which was filed on Apr. 26, 2006. The collector 114 may be a funnel or other tapered structure for collecting ink drops and directing them to the open end of the conduit 108. The collector 114 may be a connector for coupling the open end of the conduit 108 to the outlet of the melting chamber.

A connector 124 couples the compressor conduit 110 with a port 128. The port 128 enables the downstream side of valve 130 to be coupled to the compressor conduit 110. The upstream side of valve 130 is coupled to the downstream side of the valve 134. The upstream side of valve 134 is coupled to the pump 104. Pump 104 injects a fluid into the compressor conduit 110 through the valves 130 and 134. The pump 104 may displace air or another gas into the compressor conduit 110 to pressurize the conduit, although liquids may also be used for this purpose. The fluid displaced by the pump 104 flows through valve 134 to valve 130. To leverage the cost of the pump, valve 134 may be used to couple the pump 104 to the transport conduit system or another component, such as a print head for a purge function in the illustrative example. Such a valve, however, is not required for operation of the transport conduit system. Valve 130 couples the fluid injected by the pump 104 to a plurality of connectors 124, one for each color of ink used in the printer 10.

Although FIG. 5 depicts the use of a single pump 104 for transporting all ink colors, each color may have its own pump, although the cost of multiple pumps may not justify an independently controlled pump for each color. Valves 130 and 134 may be electrically actuated and coupled to the controller in the electronics module 72 for sequence control of the valves. Additionally, the pump 104 may be coupled to the controller for actuation and speed control of the pump 104. The fluid injected by the pump 104 into the compressor conduit 110 pressurizes the conduit 110 to squeeze the ink transport conduit 108 for expulsion of melted ink from the conduit 110 in a manner described in more detail below. During the pressure relief phase of the cycle, pressure is relieved by operating valve 130 so the conduit 110 is coupled to the vent port 140 of the valve 130 and the pressure is relieved. In the illustrative example, the pressure is released to ambient air. In the next phase of the cycle, valve 130 is operated to couple the conduit 110 to the pump 104 through port 144 so that the conduit 110 is pressurized again. Vent port 140 may also be coupled to a negative pressure source during the pressure relief phase of the cycle to more quickly relieve pressure within the compressor conduit 110.

Figure 6:
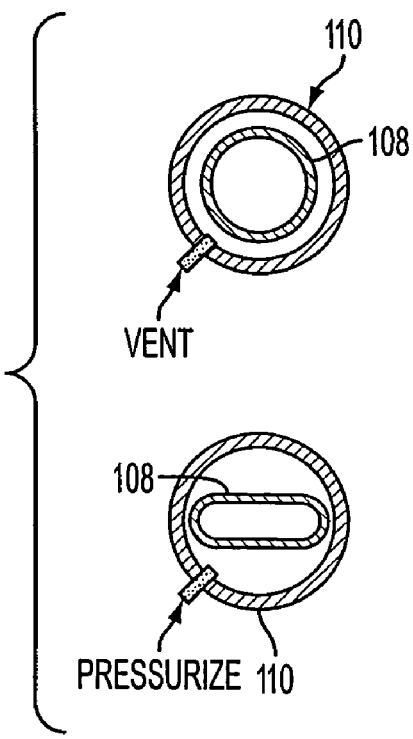
FIG. 6 is an exemplary embodiment of a double conduit that may be used in the apparatus of FIG. 5.

One embodiment of an apparatus for transporting fluid is shown in FIG. 6. The fluid transport conduit 108 is shown as being located within the compressor conduit 110. The relationship of the two conduits in this embodiment during the venting of the compressor conduit 110 is shown in the upper configuration of FIG. 6. When the conduit 110 is vented as described above, for example, with reference to valve 130, the fluid transport conduit 108 rebounds to its relaxed position. As the conduit 108 rebounds, it tends to pull fluid into its inlet to the extent that the fluid is available to flow from the collector 114. When the conduit 110 is pressurized as described above, for example, with reference to fluid being injected into the compressor conduit 110, fluid transport conduit 108 is squeezed as shown in the lower configuration of FIG. 6. This action on the conduit 108 expels fluid from the outlet of the transport conduit 108 that may be coupled, for example, to a reservoir 150, as shown in FIG. 5. In response to the subsequent venting of the compressor conduit 110, the transport conduit 108 again relaxes. Because the volume of fluid within the conduit 108 has been reduced by the amount of fluid expelled during the pressurization of the compressor conduit 110, the transport conduit 108 is able to accept a corresponding amount of fluid at its inlet, which is coupled, in the illustrative example of FIG. 5, to the collector 114.

With reference to the illustrative example shown in FIG. 5, the one way movement of fluid within the fluid transport conduit 108 may be enhanced by incorporating check valves 154 and 158 at each end of the conduit 108. Check valve 154 prevents fluid expelled from the conduit 108 into a reservoir, for example, from returning to the conduit 108. Check valve 158 prevents fluid from escaping from the conduit 108 at the inlet coupled to the collector 114. Thus, check valve 158 helps maintain pressure within the conduit 108 for the expulsion of ink into the print head reservoir 150. Check valves may be used at the inlet, outlet, or both the inlet and outlet of the transport conduit to ensure movement of the fluid through the fluid conduit. A number of factors influence the need for including check valves, including geometry of the conduits, orientation of the system relative to gravity, viscosity of the fluid, timing of the cycle phases, and other related parameters.

Figure 7:
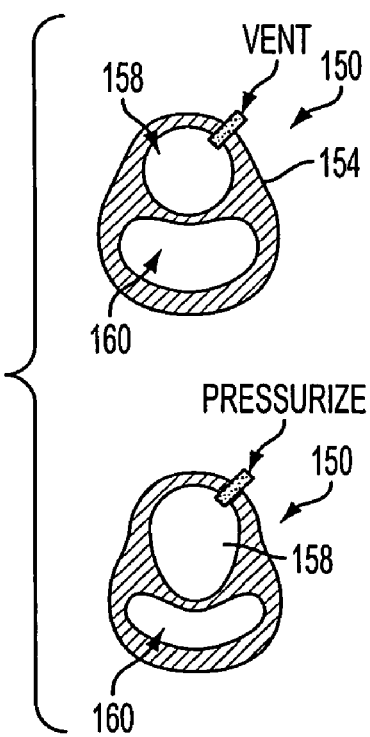
FIG. 7 is an exemplary embodiment of another double conduit that may be used in the apparatus of FIG. 5.

Another embodiment of a conduit for transporting ink in a phase change ink printer is shown in FIG. 7. This conduit 152 is comprised of a double conduit. The double conduit has a unitary wall 154 that separates the compressor conduit 158 from the ink transport conduit 160 and both of the conduits from the ambient environment. The compressor conduit 158 is generally parallel to the transport conduit 160. In this embodiment, compressing and releasing the compressor conduit 158 in a manner such as the one described above, squeezes the transport conduit 160 as shown in the bottom configuration of FIG. 7. This squeezing expels ink from the transport conduit 160. When the compressor conduit 160 is vented, in a manner such as described above, the transport conduit 160 rebounds to accept melted ink from the collector 114. Also, as noted above, a check valve may be placed at one or both ends of the transport conduit 160 to preserve one way flow of ink through the conduit.

Figure 8:
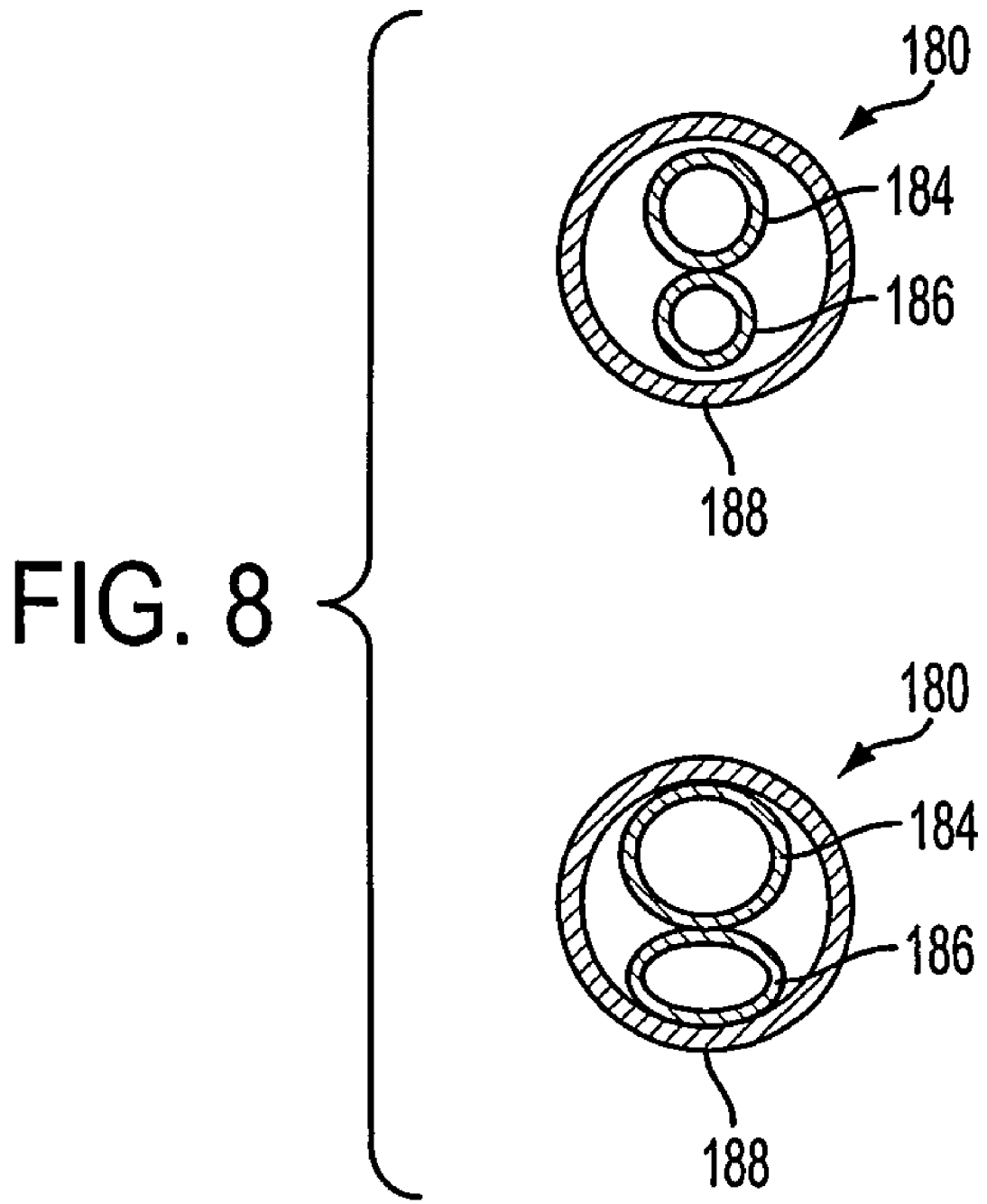
FIG. 8 is an exemplary embodiment of another double conduit that may be used in the apparatus of FIG. 5.

Another embodiment of a conduit for transporting ink in a phase change ink printer is shown in FIG. 8. In this embodiment, the conduit 180 includes a compressor conduit 184 and a fluid transport conduit 186 within a housing conduit 188. The housing conduit 188 may be flexible or rigid. The interior volume of conduit 188 is sufficiently large to accommodate both the compressor conduit 184 and the fluid transport conduit 186. The compressor conduit 158 is generally parallel to the transport conduit 160 within the housing conduit 188. Compressing and releasing the compressor conduit 184 in a manner such as the one described above, squeezes the fluid transport conduit 186 as shown in the bottom configuration of FIG. 8. The housing conduit 188 is sufficiently rigid to hold the fluid transport conduit 186 in engagement with the compressor conduit 184 to enhance the compression of the fluid conduit and expel fluid from the transport conduit 186. When the compressor conduit 184 is vented, in a manner such as described above, the transport conduit 186 rebounds to accept fluid from a fluid source. Also, as noted above, a check valve may be placed or incorporated at one or both ends of the transport conduit 186 to preserve one way flow of ink through the conduit. The conduit 152, described above with reference to FIG. 7, may also be placed within a housing conduit 188 and operated in a similar manner.

The compressor conduit 110 and the ink transport conduit 108 may be incorporated into a single, parallel conduit arrangement, as shown, for example, in FIG. 7, or they may be individual conduits. If they are individual conduits, they may be mounted one within the other one as shown, for example, in FIG. 6, or they may be placed adjacent to one another and surrounded by a third continuing tube. The conduit within a conduit arrangement shown in FIG. 6 does not require that the conduits be concentrically arranged for effective operation. The compressor conduit and the ink transport conduit may both be formed from elastomeric materials, such as a silicone or urethane, for example. In the conduit within a conduit configuration, such as shown in FIG. 6, the compressor conduit may be constructed from rigid material, such as stainless steel or brass. The conduits may be formed with internal or external springs to prevent kinking. Additionally, one or both of the conduits may be formed with a heating element, such as nichrome wire, or a cooling element to maintain the fluid within the fluid transport conduit at a desired temperature that differs from the ambient temperature.

Fully compressed displacement of the fluid transport conduit is not required for efficient pumping of the fluid into a reservoir or other receptacle. Because the full length of the tube tends to compress to a nearly equal degree only a small amount of compression is needed to displace a sizable volume of fluid from the fluid transport conduit. For example, thirty percent displacement of the transport conduit wall may be sufficient to provide an adequate flow of fluid during an expulsion phase of the pumping cycle. By reducing the compression of the transport conduit to less than 100% displacement, the life cycle of the conduit is improved over conduits compressed by peristaltic pumps or the like.

Although the conduits may be formed in cylindrical shapes, other shapes, such as flat shapes, for example, are possible. Shape may not be a critical parameter because as the transport conduit changes shape, it is generally compressed in one axis while expanding in another axis. For this reason, the compressor conduit must be sized and/or shaped to accommodate the expansion of the transport conduit or be flexible enough to conform to the expanded transport conduit. Likewise, the transport conduit may be shaped to assume the shape of a crescent, a twist, or other shape in response to the pressure within the compressor conduit. Additionally, the conduits may have a weakened wall portion that operates as a check valve. For example, forming the transport conduit with a thinner wall near the ink inlet enables that portion of the transport conduit to collapse further and more quickly than the remaining portion of the conduit. This action may seal the inlet of the conduit sufficiently to eliminate the need for a separate check valve. Weakened wall sections that operate as check valves may also be produced by flattening the fluid transport conduit in a particular region, or forming a portion of the fluid conduit with a more flexible or reduced durometer material in a particular region.

In one embodiment of a fluid transporting apparatus, 170 mm lengths of silicone tubing were used for a compressor conduit and a fluid transport conduit. The fluid transport conduit had an inner diameter of 3.5 mm and a wall thickness of 0.4 mm. The compressor conduit had an inner diameter of 5.3 mm and a 0.6 mm thick wall. The pump and valves were operated to perform a pressure and venting cycle in 0.6 seconds. The average pump rate was 14.6 ml/minute and the compressed air pressure was approximately 5 PSI. Control of pump pressure, as well as cycle "on" and "off" times, were found effective for varying the flow rates through the transport apparatus.

Various embodiments of the fluid transport apparatus may be used to implement a method for transporting fluid. The method includes relieving pressure in a compressor conduit to enable a fluid transporting conduit to draw fluid from a fluid supply as the fluid transporting conduit rebounds in response to the relieved pressure, and injecting fluid into the compressor conduit to increase pressure within the compressor conduit for the purpose of expelling a portion of the fluid in the fluid transporting conduit. Relieving pressure in the compressor conduit may be achieved through a variety of techniques. These techniques may include opening the conduit to a lower pressure area so a pressure drop occurs within the compressor conduit. In a closed system, such as a piston within a cylinder that is coupled to the compressor conduit, one stroke of the piston increases pressure within the compressor conduit and the return stroke withdraws the compression fluid into the cylinder to vent the compressor conduit so the transport conduit is able to rebound. Other techniques for relieving pressure may be used to reduce pressure within the compressor conduit so the fluid transport conduit may rebound and draw fluid into the fluid transport conduit. All such techniques are encompassed within the term "venting" as used herein.

In a device requiring transformation of a solid to a liquid, such as the phase change ink imaging device described above, the method may also include the melting of a solid to produce a liquid and the collection of the liquid for insertion into the fluid transporting conduit. The method may also include temperature regulation of the conduits to maintain the liquids within the conduits at a desired temperature. The method may also include preventing backflow of the expelled fluid into the fluid transporting conduit and preventing backflow of the fluid into the fluid reservoir or other receptacle to maintain pressure for expelling the fluid from the fluid transporting conduit. Additionally, the method may include coupling of the compressor conduit to a negative pressure source to assist in restoring the fluid transport conduit shape and/or reducing pressure in the compressor conduit more quickly.

In order to maintain a non-ambient temperature for fluid being transported through the fluid transport conduits described above, the fluid transport apparatus may include a thermal conductor. The thermal conductor is configured to maintain the fluid within the fluid transport conduit at a non-ambient temperature as the compressor conduit is operated to move fluid through the fluid transport conduit. The thermal conductor may be incorporated in either the fluid transport conduit or the compressor conduit or both conduits. The thermal conductor may be used with any of the embodiments shown in FIGS. 6-8 as described more fully below. As used herein, a thermal conductor refers to a component that may be used to either add heat or remove heat from fluid being transported through the fluid transport conduit. The thermal conductor may be a heater element, such as a nichrome wire, an additional tube in which heated fluid flows independently of the conduit pump, a self-contained heat pipe, thermally controlled fluid that is independently heated and/or cooled and that is used to cycle the compressor conduit, or some other device suitable to a particular implementation.

In one embodiment, a heating thermal conductor may be incorporated in one or both of the conduits by forming the conduit(s) from a substance that generates heat in response to an electrical current coupled to the substance. The substance includes non-conductive structural material containing a substantially uniform dispersion of a conductive particulate material selected from the group of carbon, graphite, electrically conductive metals, metal oxides, metal alloys, particles coated or plated with electrically conductive metals, metal oxides, or metal alloys, and mixtures thereof. The substance may also include negative temperature coefficient (NTC) particulate material and/or positive temperature coefficient (PTC) particulate material for providing self-regulation of the heat-generating conduit. Other additive materials may also be incorporated in the structural material to provide other non-heating properties. Coupling an electrical current so it passes through a fluid transport conduit or a compressor conduit formed from such material enables the conduit to generate heat. The NTC and PTC materials help regulate the temperature of the component. Preferably, in embodiments formed from the heat-generating substance, the structural material is an elastomeric material to render the conduit flexible. An example of an elastomeric material that may be used is silicone.

In an embodiment of a fluid transport apparatus that may be used in a phase change printer, a fluid transport conduit for transporting melted ink is formed from the heat-generating substance described above. The conduit may be circular in cross-section and cut to an appropriate length for coupling an ink reservoir to a print head. An electrode is provided at each end of the conduit to provide electrical energy through the conduit so that the conduit generates heat uniformly along its length. The composition used to form the conduit is sufficiently flexible that it may be moved during installation without damaging the thermal generating and regulating properties of the conduit. In one embodiment, the conduit is formed from a composition of NTC and PTC materials having an operational range of about 60° C. to about 120° C. In another embodiment of a fluid transport apparatus used in a phase change printer, the fluid transport conduit and the compressor conduit are co-extruded so the fluid transport conduit is located within the compressor conduit. For rigid heat-generating conduits and/or pumps, the NTC and PTC materials may be added to a structural plastic material and the resulting mixture is melted and then extruded or injection molded into the desired final form for a conduit or a pump. After cooling, the structural plastic material maintains the desired shape while the NTC and PTC compounds provide the heating and the temperature regulating functions. For flexible conduits, the NTC and PTC compounds are added to an elastomeric material and the resulting mixture is melted. Although injection molding may be used to produce flexible articles, extrusion is the more likely method for producing flexible tubular or conduit articles.

The ratio of NTC particles to PTC particles determines the operational range of an article formed by the combination described above. Additionally, the placement of the electrodes on the conduit affects the operational parameters for a conduit. For example, electrical current passing from one end of the heat-generating conduit to the other end encounters a different resistance and causes a different PTC behavior than an electrical current passing from one side of the conduit to another or from one point in the conduit to another. The variations arising from these geometrical considerations may be used to optimize the heat generating and temperature regulating properties of the conduits in the fluid transport apparatus.

The structural material may be any of various known materials. Among those contemplated for use in the temperature regulating articles are polyphenylene sulfide (PPS), liquid crystal polymer (LCP), vinyl, silicone, and nylon. Liquid crystal polymer may be used for the manufacture of conduits having a high temperature operational range in one embodiment while nylon may be used for the manufacture of articles having a moderate temperature operational range in another embodiment. Silicone may be used in an embodiment of an article requiring flexibility. Various additives (fillers) for any of these material compositions may be used which can influence thermal conductivity and/or formability, lower cost by increasing non-functional material volume, add color, or the like.

Figure 9:
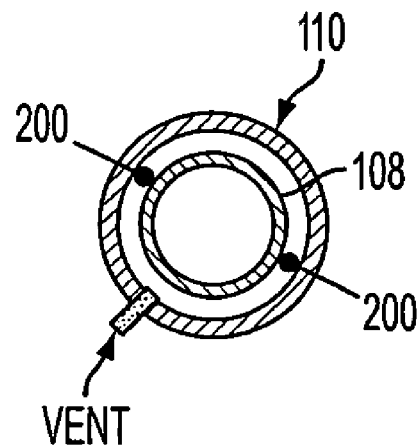
FIG. 9 is an exemplary embodiment of the conduit shown in FIG. 6 with a thermal conductor configured for maintenance of a fluid temperature within the fluid transport conduit.
Figure 10:
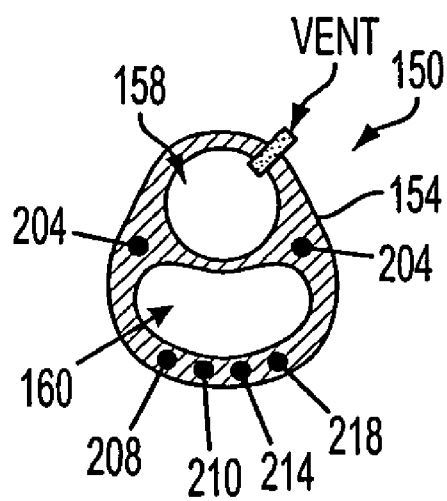
FIG. 10 is an exemplary embodiment of the conduit shown in FIG. 7 with a plurality of thermal conductors configured for maintenance of a fluid temperature within the fluid transport conduit.
Figure 11:
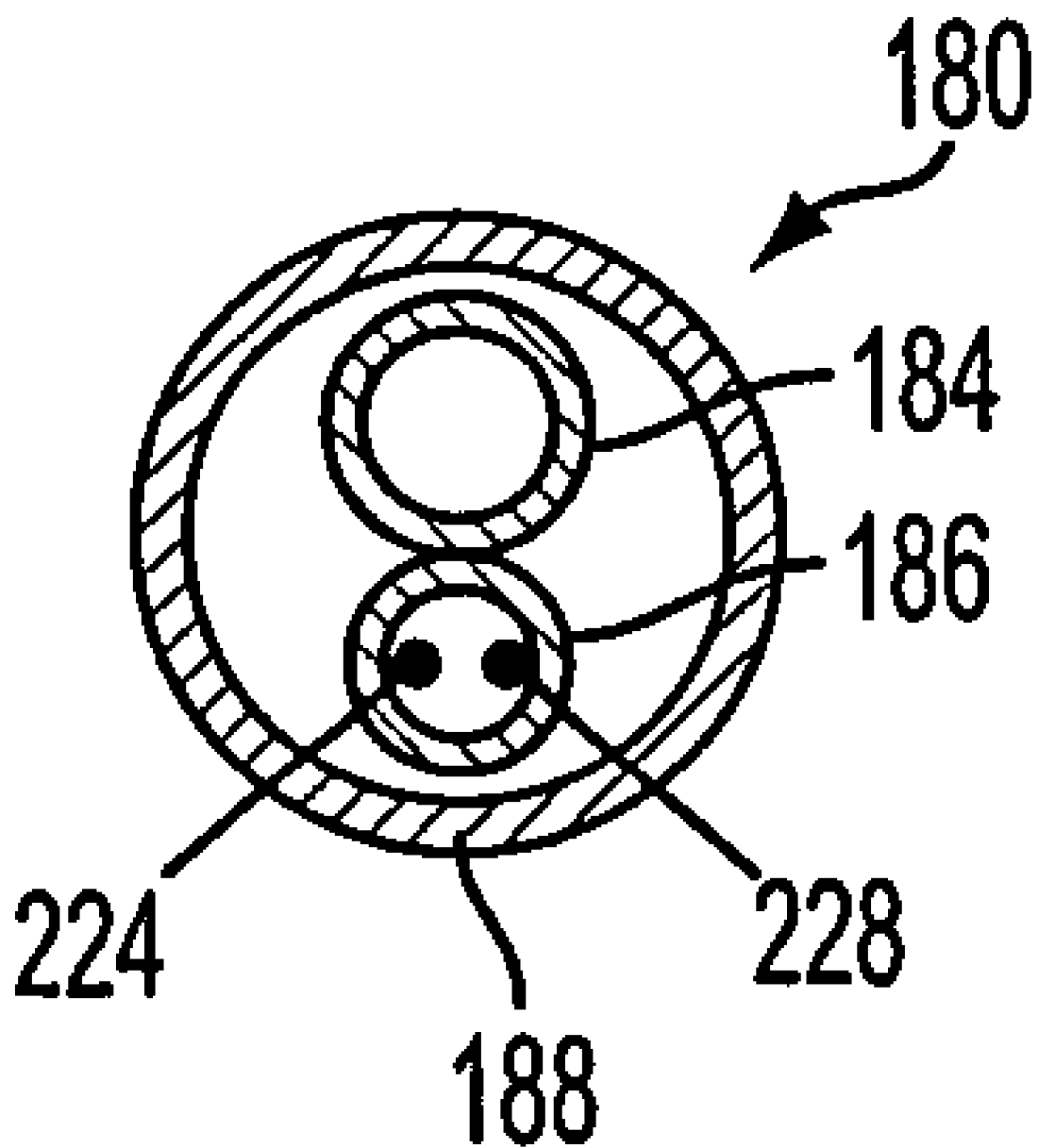
FIG. 11 is an exemplary embodiment of the conduit shown in FIG. 8 with a thermal conductor configured within the fluid transport conduit.

The embodiments of FIGS. 6-8 are shown in FIGS. 9-11 with thermal conductors for maintaining a non-ambient temperature for a transported fluid. In these embodiments, the thermal conductors may be electrically conductive wires, such as stainless steel or nichrome wires, that are configured to heat fluid within the fluid transport conduit in response to an electrical current being passed through the wire. In one embodiment, the wire is helically wound about a conduit. For example, FIG. 9 shows a single wire 200 that is helically wound about the fluid transport conduit 108. In FIG. 10, a single wire 204 is linearly configured to extend from one end of the conduit 152 to the other end and then return to the first end in a linear manner. Temperature uniformity of the transport may be affected by the length of the transport, its proximity to other heating or cooling influences, attachments that act as heat sinks, or other environmental factors. By varying the pitch of a helically wound heater wire for the transport along all or a portion of the length of the transport, the temperature uniformity may be normalized or otherwise improved. Alternatively, the wire 204 may be configured in serpentine fashion from one side to the other side in the common wall between passage 158 and passage 160. As another example, four wires 208, 210, 214, and 218 extend from one end of the conduit 152 to the other end. Each wire may extend in a linear manner between the ends. By selectively passing current through one or more wires, the temperature of the fluid transported by the conduit 152 may be more precisely regulated.

In configurations in which the thermal conductors are helically or curved in a serpentine manner, the pitch of the wire winding may be used to alter the heat generating characteristics of the thermal conductor. Of course, the geometry of the configuration and the material composition of the conduits also affect the thermal characteristics of the various configurations of thermal conductors.

As noted above, a thermal conductor may be a heat generating or heat removing component. In FIG. 11, heat removing conveyances 224 and 228 extend along the length of fluid transport conduit 186. The thermal conductors 224 and 228 may each be a heat removing conveyance, such as a heat pipe or a thermoelectric device or they may be tubes carrying a gas or liquid that removes heat, such as freon or chilled water. Alternatively, thermal conductors 224 and 228 may be heat-generating components. The heat generating conductors shown in the figures may also be tubes carrying a heated liquid or gas. A material, such as solid ink, may need to be heated to reestablish a liquid state, if some volume of the material is solidified in the conduit as the printer is turned on or comes out of a low energy standby state. In this situation, the thermal conductor must provide a temperature sufficiently higher than the melt point of the material to liquefy it in a reasonable time frame. The description of maintaining the temperature of the fluid being transported in the conduit is intended to encompass such thermal transitions.

Configurations for the thermal conductors may be varied. As shown in FIGS. 9-11, the thermal conductors may be located within the fluid transport conduit passageway, along the outer diameter of the fluid transport conduit, within the common wall between a compressor conduit and a fluid transport conduit, or along a portion of the fluid transport conduit. Additional configurations may also be used. For example, one or more thermal conductors may be located on the outer diameter of the compressor conduit, within the wall of the compressor conduit, or at any location inside the inside diameter of the compressor conduit. Likewise, thermal conductors may be located within the wall of the fluid transport conductor. Other configurations and combinations are possible that are within the scope of the appended claims.

While a significant number of configurations are possible, some are better suited for various applications than other configurations. For example, in configurations having the fluid transport conduit within the compressor conduit, the thermal conductor may be better located within the fluid transport conduit or its wall than being between the inside diameter of the compressor conduit and the outside diameter of the fluid transport conduit. Such placement better preserves the sealing integrity of the compressor conduit.

One method of manufacturing a fluid transport conduit with a thermal conduit begins by using a mandrel for forming a core layer of a conduit. A thermal conductor may be appropriately wound or linearly located with respect to the core layer. An elastomeric layer, such as silicone, may then be applied to coat the conduit and thermal conductor in a manner than leaves ends of the thermal conductor(s) exposed. Connectors may then be mounted to the exposed ends, if the thermal conductor is electrical, so the conductor may be coupled to an electrical current source. For tubes carrying a cooling or heating liquid or gas, fittings are provided at the exposed ends of the tube(s) for coupling the tubes to a liquid or gas source.

A fluid transport apparatus that maintains a transported fluid temperature may be incorporated in a phase change printer. The phase change printer includes an ink melter for melting solid ink sticks to produce melted ink, a melted ink collector for collecting melted ink produced by the melting element, a melted ink transport apparatus for transporting melted ink from the melted ink collector, a melted ink reservoir for storing melted ink received from the melted ink transport apparatus, a print head for receiving melted ink from the melted ink reservoir, and an imaging surface onto which the print head ejects melted ink to form an image. The melted ink transport apparatus further includes a fluid transport conduit for transporting melted ink and a compressor conduit configured to pump fluid through the fluid transport conduit by pressurizing and venting the compressor conduit. The fluid transport conduit has an inlet end that is coupled to the melted ink collector and an outlet end that is coupled to the melted ink reservoir. A thermal conductor is configured in the melted ink transport apparatus to maintain the fluid within the fluid transport conduit at a non-ambient temperature as the compressor conduit is operated to move the fluid through the fluid transport conduit. A fluid pump is coupled to the inlet of the compressor conduit to inject fluid into the compressor conduit and a venting valve is coupled to the compressor conduit for selectively relieving pressure in the compressor conduit. The venting valve is operated to vent or enable pressurization of the compressor conduit selectively to pump melted ink through the ink transport conduit.

In operation, a fluid transport apparatus is coupled between a pump and a receiving port. A thermal conductor of the fluid transport apparatus is coupled to an electrical current source, liquid source, or gas source, or, as in the case of a heat pipe, to be coupled to a thermal load or heat sink. As fluid is pumped through the fluid transport conduit by operating the compressor conduit, the thermal conductor provides or removes heat to achieve the desired temperature of the fluid transported through the fluid transport conduit. After a standby condition has ended, the thermal conductor may be activated to heat or cool the fluid transport conduit so the fluid transport apparatus is more quickly brought to its operational temperature.

Those skilled in the art will recognize that numerous modifications can be made to the specific implementations of the melting chamber described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A phase change ink imaging device comprising:
   an ink melter for melting solid ink sticks to produce melted ink;
   a melted ink collector for collecting melted ink produced by the melting element;
   a melted ink transport apparatus for transporting melted ink from the melted ink collector;
   a melted ink reservoir for storing melted ink received from the melted ink transport apparatus; and
   a print head for receiving melted ink from the melted ink reservoir;
   the melted ink transport apparatus further comprising:
      a fluid transport conduit for transporting melted ink, the fluid transport conduit having an inlet end that is coupled to the melted ink collector and an outlet end that is coupled to the melted ink reservoir;
      a compressor conduit configured to pump fluid through the fluid transport conduit by pressurizing and venting the compressor conduit;
      a thermal conductor configured to achieve a non-ambient temperature for the fluid within the fluid transport conduit as the compressor conduit is operated to move the fluid through the fluid transport conduit;
      a fluid pump that is fluidly coupled to an inlet of the compressor conduit to inject fluid into the compressor conduit to a pressure that compresses the fluid transport conduit to pump melted ink through the fluid transport conduit; and
      a venting valve fluidly coupled to the compressor conduit for selectively relieving the pressure in the compressor conduit that compresses the fluid transport conduit, the venting valve being operated to vent the pressure in the compressor conduit that compresses the fluid transport conduit and to enable pressurization of the compressor conduit to compress and decompress the fluid transport conduit selectively to pump melted ink through the fluid transport conduit.

2. The phase change ink imaging device of claim 1, the thermal conductor being an electrically conductive heater wire.

3. The phase change ink imaging device of claim 2, the electrically conductive heater wire being helically configured with variable pitch to improve temperature uniformity over multiple regions of the fluid transport length.

4. The phase change ink imaging device of claim 1 wherein the fluid transport conduit is located within the compressor conduit.

5. The phase change ink imaging device of claim 1 wherein the portion of the fluid transport conduit is generally parallel to the portion of the compressor conduit that compresses the fluid transport conduit.

6. The phase change ink imaging device of claim 5 further comprising:
   a common wall between the fluid transport conduit and the compressor conduit.

7. The phase change ink imaging device of claim 1, the thermal conductor being incorporated within the fluid transport conduit.

8. The phase change ink imaging device of claim 1, the thermal conductor comprising:
   non-conductive elastomeric material containing a substantially uniform dispersion of a conductive particulate material selected from the group of carbon, graphite, electrically conductive metals, metal oxides, metal alloys, and mixtures thereof, the elastomeric material being formed as a conduit; and
   a pair of electrodes for coupling the thermal conductor to an electrical current source so an electrical current passes through the conduit and generates heat.

9. The fluid transport apparatus of claim 8, the thermal conductor being a conduit that encircles one of the fluid transport conduit and the compressor conduit.

10. The phase change ink imaging device of claim 8, the thermal conductor being the transport conduit.

11. The phase change ink imaging device of claim 2, the electrically conductive heater wire being within a conduit wall.

12. The phase change ink imaging device of claim 2, the electrically conductive heater wire being located outside a conduit outer diameter.

13. The phase change ink imaging device of claim 2, the electrically conductive heater wire being located within a conduit inner diameter.

14. The phase change ink imaging device of claim 1, the thermal conductor being a heat removal conveyance operable to reduce temperature of the fluid being transported within the transport conduit.

15. The phase change ink imaging device of claim 14, the heat removal conveyance being a fluid coolant passed along at least a portion of the fluid transport apparatus.

16. The phase change ink imaging device of claim 1, the thermal conductor being operable to heat at least a portion of the fluid transport to maintain a relatively constant temperature of the fluid being transported.

17. The phase change ink imaging device of claim 1, the thermal conductor being operable to remove heat from at least a portion of the fluid transport to maintain a relatively constant temperature of the fluid being transported.

* * * * *